United States Patent [19]

Tilman

[11] Patent Number: 4,648,166

[45] Date of Patent: Mar. 10, 1987

[54] CLAW EXTRACTOR

[76] Inventor: Paul L. J. Tilman, Rue Ste Anne 59, B-4330 Grace-Hollogne, Belgium

[21] Appl. No.: 717,181

[22] PCT Filed: Jul. 17, 1984

[86] PCT No.: PCT/BE84/00018

§ 371 Date: Mar. 15, 1985

§ 102(e) Date: Mar. 15, 1985

[87] PCT Pub. No.: WO85/00546

PCT Pub. Date: Feb. 14, 1985

[30] Foreign Application Priority Data

Jul. 18, 1983 [LU] Luxembourg .......................... 84921

[51] Int. Cl.[4] .............................................. B23P 19/02

[52] U.S. Cl. .......................................... 29/252; 29/261

[58] Field of Search ................. 29/252, 258, 259, 261, 29/262

[56] References Cited

U.S. PATENT DOCUMENTS 2,374,861 5/1945 Graham ............................... 29/261
2,524,698 10/1950 Felton .................................. 29/261
3,337,943 8/1967 Powell ............................. 29/261 X
4,019,233 4/1977 Jirele ..................................... 29/261

FOREIGN PATENT DOCUMENTS 465209 6/1946 Belgium .
866328 7/1941 France ................................. 29/261
2390250 12/1978 France .
142223 9/1930 Switzerland .......................... 29/261
248279 2/1948 Switzerland .......................... 29/261
363282 12/1931 United Kingdom .
1307234 2/1973 United Kingdom .
1543796 4/1979 United Kingdom .

*Primary Examiner*—Frederick R. Schmidt
*Assistant Examiner*—Steven P. Schad
*Attorney, Agent, or Firm*—Fishman & Dionne

[57] ABSTRACT

A claw extractor for pulling a part from a shaft. The extractor comprises a plurality of claws for gripping the part and a drive element for engaging the shaft. Provided on the rear end of the tool is a guide provided with arcuate grooves extending from the inside to the outside. Slide stubs, cooperatively connected to the claws, are received within the grooves to thereby move the claws.

6 Claims, 3 Drawing Figures

CLAW EXTRACTOR

Figure 1:
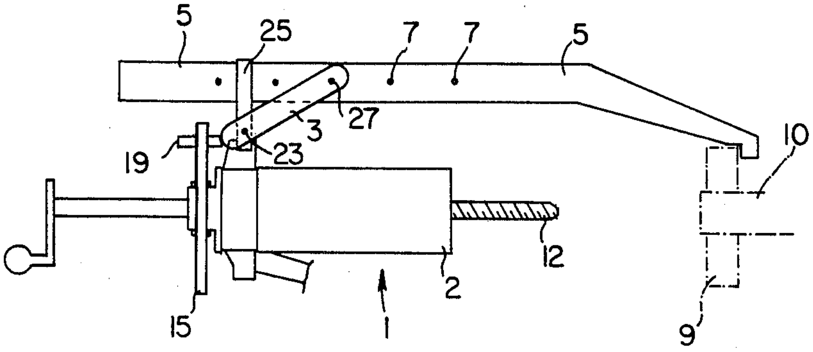

The present invention relates to a claw extractor, in particular a large sized claw extractor, which incorporates inprovements designed to facilitate its handling.

From the documents No. CH-A-248,279, No. FR-A-866,328 and No. GB-A-363,282, claw extractors are known in which the claws are articulated directly on the body of the claw extractor, and which incorporate, at the end opposite to that designed to come into contact with the part to be separated, guiding means which are in direct communication with a control member such as a cam plate, for example. The latter is designed to spread the claws apart from each other or bring them closer together, and also to maintain them in contact with the part to be removed, while they are not adhering to the latter as a result of the force exerted by the extractor.

However, in the known devices, good matching of the claw extractor to the part to be removed is difficult and relies exclusively on the angular rotation of the cam plate, and consequently does not permit self-tightening of the claws in the case where the part to be removed is irregular, conical or worn.

The present invention therefore relates to the provision of a claw extractor of improved design which can be handled easily by an operator who can guide the extractor and also adjust the spacing of the claws until the pressure of the shank on the part to be separated is sufficient for the claws to remain in contact with the latter.

Another aim of the present invention relates to the provision of a claw extractor which, by means of improved design, permits self-tightening of the claws in order to provide for good matching of the extractor to any part to be separated.

The aim of the present invention is achieved by a claw extractor which incorporates a guide which is free to rotate about the axis of the extractor, but fixed in translation along this axis, the said guide containing slots which enable the simultaneous movement of the claws to be guided by an angular rotation of the guide around the axis of the extractor.

In a first embodiment, the said guide advantageously consists of a disk mounted at the rear end of the extractor, which is opposite the end designed to come into contact with the parts to be separated, the said disk incorporating slots in which the rear ends of the claws slide, the slots being arranged so as to extend from the center outwards.

According to a preferred embodiment of the present invention, the said guide advantageously consists of a disk mounted at the rear end of the extractor, which is opposite the end designed to come into contact with the parts to be separated, the said disk incorporating slots which extend from the center outwards in which there slide stubs attached to links, the links being articulated on the claws and also connected to the latter by yokes which prevent the free rotation of the claws relative to the links but which permit the claws to slide in the yokes.

In this manner, the operator can continuously adjust the spacing of the claws by operating the guide in such a way that it rotates through a certain angle around the axis of the extractor. The stubs are thus moved away from the extractor by causing the link to pivot around the point of articulation on the extractor to move the claws closer to or further away from each other.

To facilitate handling by the operator, said guide can advantageously incorporate a control arm.

Figure 2:
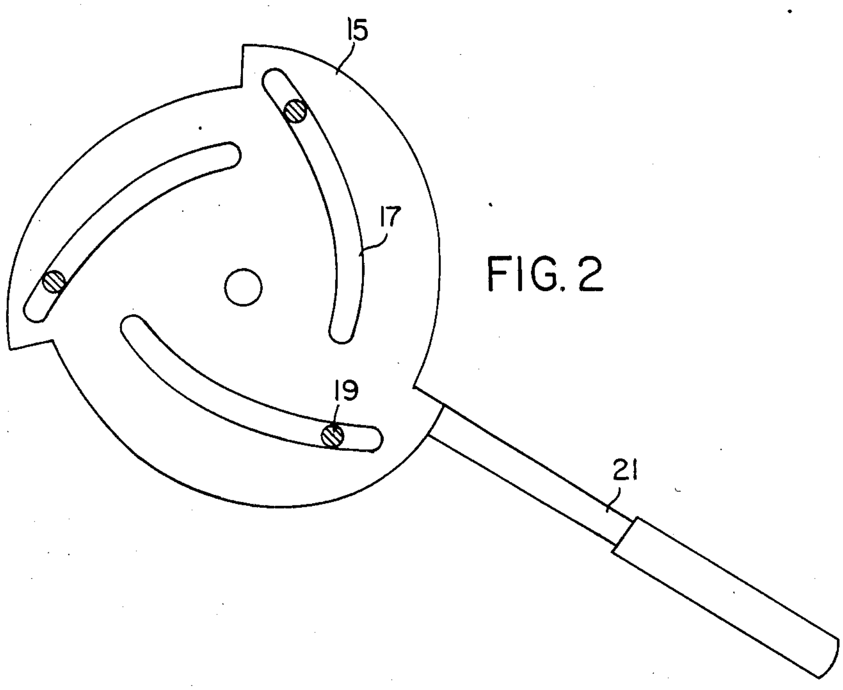
Figure 3:
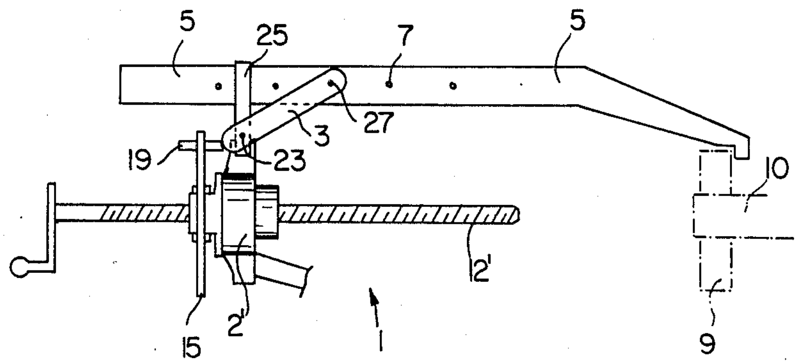

Other details and advantages will become more clearly evident in the description of the attached figures, in which:

FIG. 1 is a partial view of a claw extractor, in which only one claw is shown, according to one embodiment of the invention, FIG. 2 is a plan view of the guide used in the embodiment of FIG. 1, and FIG. 3 is a partial view of a claw extractor of the type having a threaded shank which can rotate in a nut in accordance with another embodiment of the present invention.

By way of example, the present description relates to a hydraulic claw extractor. This does not, however, exclude the possibility that the present invention may also apply to a manual extractor, for example.

The extractor 1 consists of a hydraulic (or other) jack 2 actuated by a hand pump (not shown), for example, or connected to a source (not shown) of hydraulic fluid. To the cylinder of the jack there are attached three links 3 which are also connected to the corresponding claws 5. The claws 5 have several holes 7, which are intended to permit adjustment of the spacing between the part 9 to be removed from the shaft 10 and the shank 12 which will bear against the end of this shaft 10.

According to the invention, the claw extractor incorporates a guide 15 which is provided with slots 17, preferably curved, in which there slide stubs 19 which are attached to the links 3. By turning the guide about the axis of the extractor 1 by means of an arm 21, the stubs move towards or away from the said axis, depending on the direction of movement, given the arrangement and particular shape of the slots 17. As a result of this, the link 3 pivots about its point of articulation 23 to move the claws 5 away from or towards each other.

A yoke 25 prevents the free rotation of the claws about the point of articulation 27 but permits the claw 5 to slide in the yoke when the angular position of the link 3 is altered by the action of the guide 15.

According to an advantageous embodiment of the present invention, the stub 19 is attached to the link 3 by way of a steel plate partially bent around the said link 3 in order to prevent relative movement of the stub 19 with respect to the said link 3. However, any other form of assembly can also be provided, such as, for example, two bolts or two rivets.

In FIG. 3, an alternative embodiment of the present invention is shown. The FIG. 3 embodiment is identical to the FIG. 1 embodiment except for the use of a threaded shank 12' which can rotate in a nut 2' rather than the piston shank 12 which slides in cylinder 2 of FIG. 1. Both the piston shank/cylinder and threaded shank/nut embodiments are well known in the art and are merely two alternative constructions of the claw extractor in accordance with the present invention.

An advantage achieved by the present invention consists in the fact that the handling operations are greatly facilitated and that a single operator is sufficient to use this equipment, even when the size is very large. When the extractor is of a very large size, it will naturally be suspended from a travelling crane or the like, the mounting operation consisting simply of bringing the equipment into position and adjusting, by means of the device of the invention, the spacing of the claws so as to be able to arrange it appropriately on the part 9.

Another advantage consists in the fact that the guide 15, in the form of application shown, is compact, and can be housed in the usual boxes supplied with this type of equipment.

An additional advantage consists in the fact that the said guide can be fitted to any existing extractor and that existing equipment can be converted.

I claim:

1. Claw extractor (1) including a body having a shank therein and having at least three unitary, one piece claws (5) which are designed to hook onto a part (9) to be removed from a shaft (10) while the shank (12) bears against this shaft (10), the claw (5) being connected to the body (2) of the extractor by way of a link (3), the shank being aligned with the longitudinal axis of the extractor and the extractor further including:

guide means (15) which freely rotate about the longitudinal axis of the extractor, but is fixed in translation along said axis, said guide means (15) including closed slots (17) therethrough which permit the simultaneous movement of the claws (5) to be guided by an angular rotation of the guide means about said axis of the extractor; and said guide means (15) comprising a disk mounted at the rear end of the extractor, said rear end being opposite the extractor end which is adapted to contact the part to be removed (9), said disk (15) incorporating said slots (17) which extend from the center outwardly; received in said slots are slidable stubs (19) fixed to said links (3), the links being articulated on the claws (5) and also connected to the claws by yokes (25) which prevent the free rotation of the claws (5) relative to the links (3), but which permit the claws to slide in the yokes.

2. Claw extractor as claimed in claim 1, in which said guide means (15) incorporates a control arm (21).

3. Claw extractor as claimed in claim 2, in which the guide means (15) incorporates curved slots (17) which extend from the interior outwardly.

4. Claw extractor as claimed in claim 1, in which the guide means (15) incorporates curved slots (17) which extend from the interior outwardly.

5. Claw extractor as claimed in claim 1 wherein the claw extractor shank is a threaded shank and wherein the claw extractor body includes a nut, said threaded shank being adapted to threadably engage said nut.

6. Claw extractor as claimed in claim 1 wherein the claw extractor shank is a piston shank and wherein the claw extractor body includes a cylinder, said piston shank being adapted to slide in said cylinder.

* * * * *